(12) United States Patent
Koyama et al.

(10) Patent No.: US 6,397,466 B1
(45) Date of Patent: Jun. 4, 2002

(54) METHOD FOR MANUFACTURING ORIFICE PLATE AND LIQUID DISCHARGE HEAD

(75) Inventors: Shuji Koyama; Junji Tatsumi, both of Kawasaki; Ken Ikegame, Tokyo; Hiroaki Mihara, Musashino; Miki Ito, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/340,462

(22) Filed: Jun. 28, 1999

(30) Foreign Application Priority Data

Jun. 30, 1998 (JP) .......................................... 10-184767

(51) Int. Cl.⁷ .......................... B21D 53/76; B23K 26/02
(52) U.S. Cl. .......................... 29/890.1; 29/852; 430/18; 430/320; 430/323; 216/27; 216/65; 347/45; 347/47; 219/121.71
(58) Field of Search .................... 29/890.1, DIG. 91, 29/896.6, 852; 219/121.7, 121.71; 430/18, 320, 322, 323; 216/27, 65; 347/45.47

(56) References Cited

U.S. PATENT DOCUMENTS

| | | | | | |
|---|---|---|---|---|---|
| 4,728,392 A | * | 3/1988 | Miura et al. | ................. | 430/323 |
| 5,252,433 A | * | 10/1993 | Fujioka et al. | .............. | 430/323 |
| 5,455,998 A | * | 10/1995 | Miyazono et al. | ......... | 29/890.1 |
| 5,594,479 A | * | 1/1997 | Inoue et al. | ........... | 219/121.71 |
| 5,628,926 A | * | 5/1997 | Belgacem et al. | ..... | 219/121.71 |
| 5,653,901 A | * | 8/1997 | Yoshimura | ................. | 29/890.1 |
| 5,760,803 A | | 6/1998 | Yamamoto et al. | ........... | 347/47 |

FOREIGN PATENT DOCUMENTS

| | | | | |
|---|---|---|---|---|
| JP | 61-59911 | 12/1986 | | |
| JP | 61-59914 | 12/1986 | | |
| JP | 64-61025 | * 3/1989 | ................. | 430/322 |
| JP | 2-188255 | 7/1990 | | |
| JP | 5-254133 | * 10/1993 | ................. | 29/890.1 |

OTHER PUBLICATIONS

Capitanio, D. Advantages to Point of Use Filtration of Photoresists in Recontamination on the Water Surface, Advanced Semiconductor Manufacturing Conference Workshop, 1998 IEEE/SEMI, pp. 247–251, Sep. 9, 1998.*

* cited by examiner

Primary Examiner—S. Thomas Hughes
Assistant Examiner—A. Dexter Tugbang
(74) Attorney, Agent, or Firm—Fitzpatrick, Cella, Harper & Scinto

(57) ABSTRACT

A method for manufacturing an orifice plate with a plate material having a through hole arranged to become an orifice for discharging liquid comprises the steps of arranging a resin layer in a position corresponding to the through hole on the surface of a conductive substrate in a configuration corresponding to the through hole in a thickness corresponding at least to the lenght of the through hole, forming a metallic layer by means of electro-forming on the exposed surface of a portion of the conductive substrated corresponding to the plate material in a thickness corresponding to the thickness of the plate material in order to obtain the metallic layer in a state where the resin layer is filled in the through hole portion, applying water repellent resin to the surface of the metallic layer having the resin layer filled therein, peeling off the metallic layer from the conductive substrate together with the resin layer to obtain the plate material in a state where the through hole portion is filled with the resin layer, and removing by laser irradiation the resin layer portion of the plate material in a state where the resin layer is filled in the through hole portion having the water repellent layer coated on the surface in order to form the through hole.

7 Claims, 12 Drawing Sheets

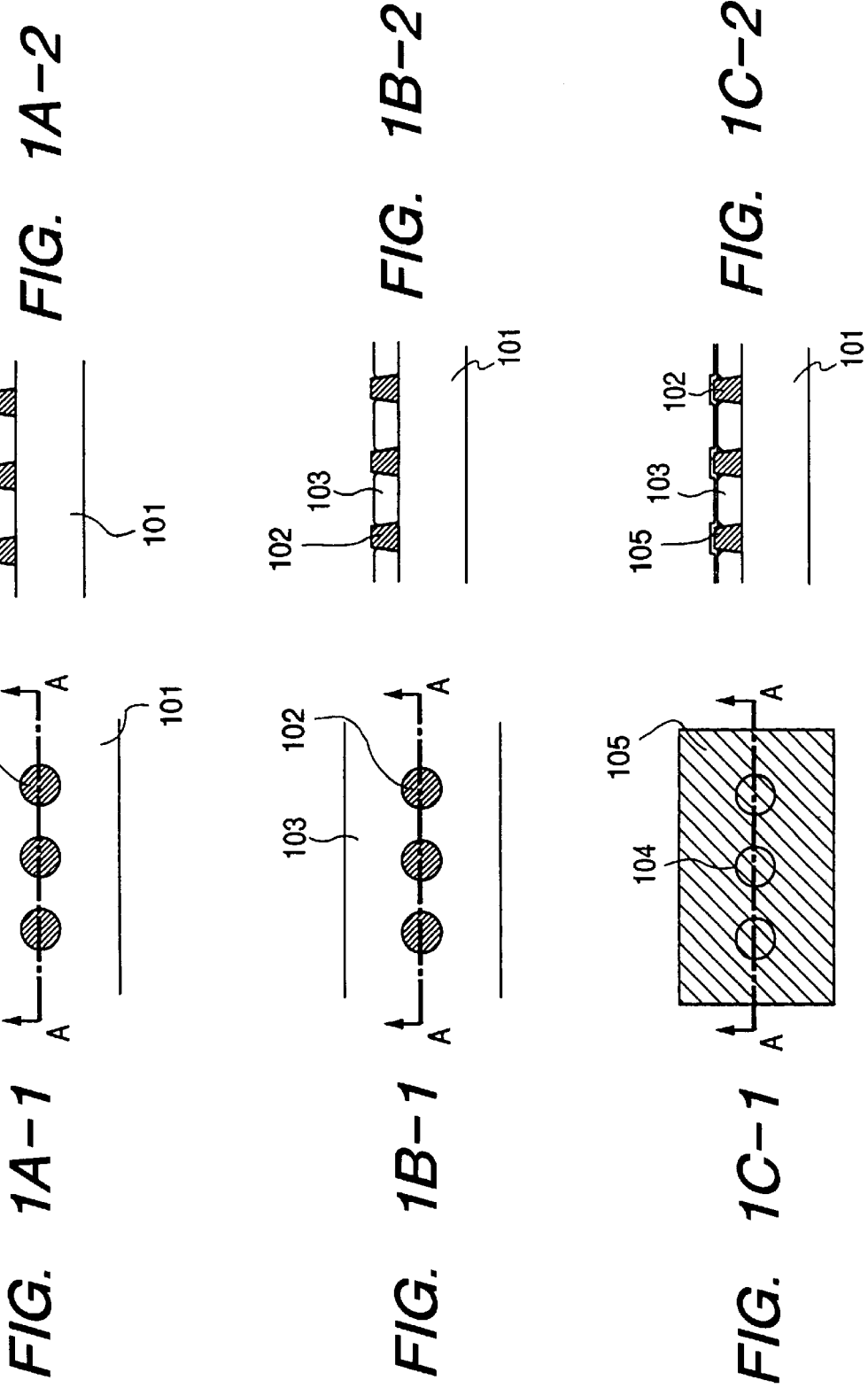

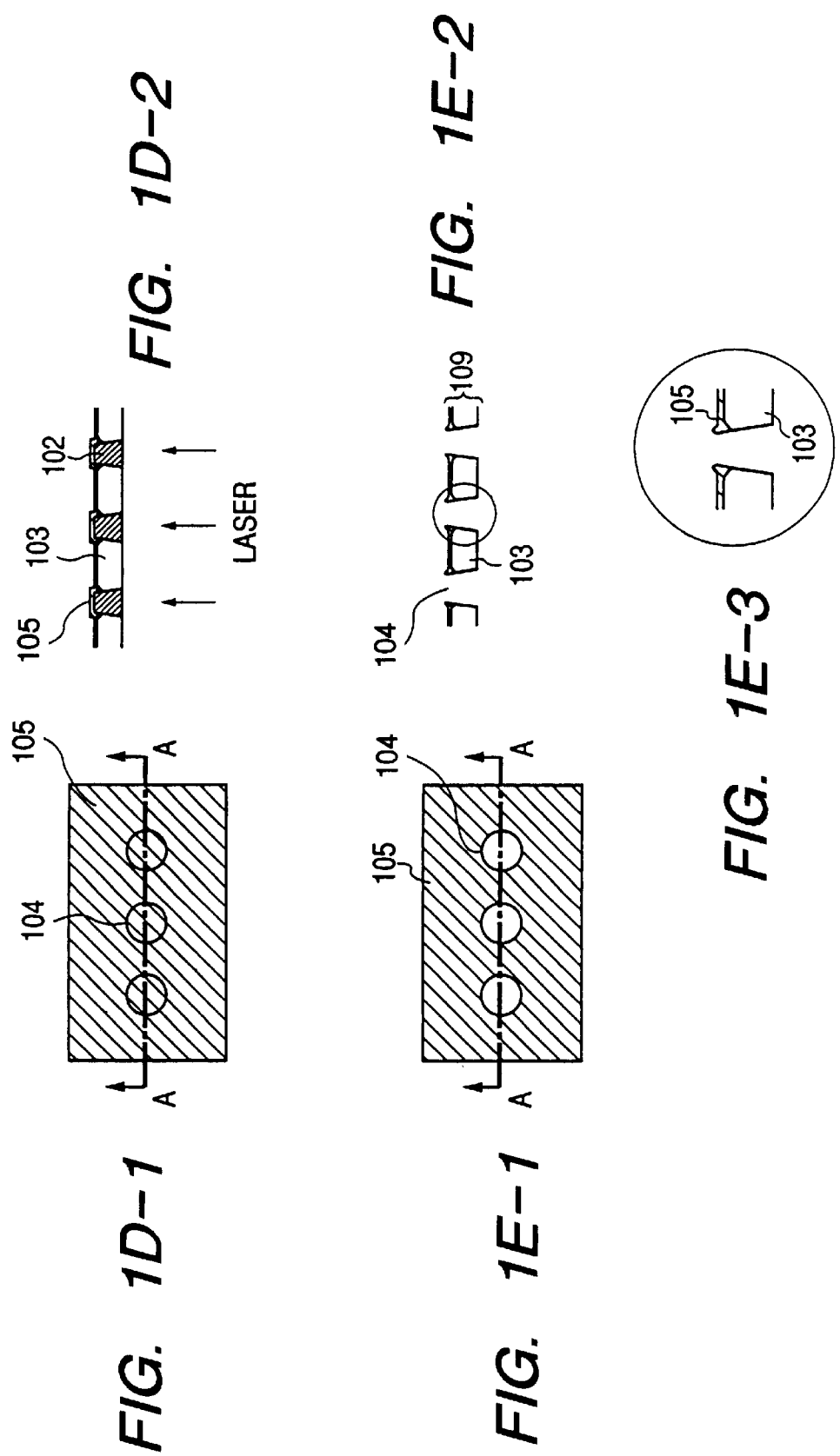

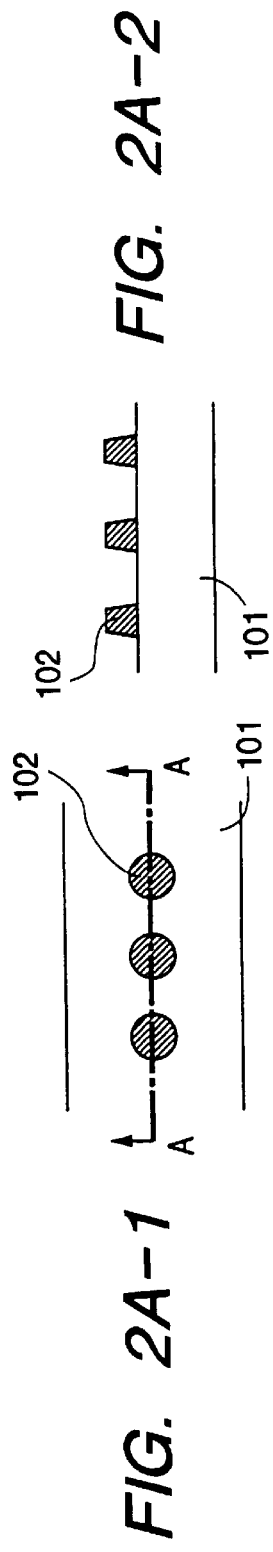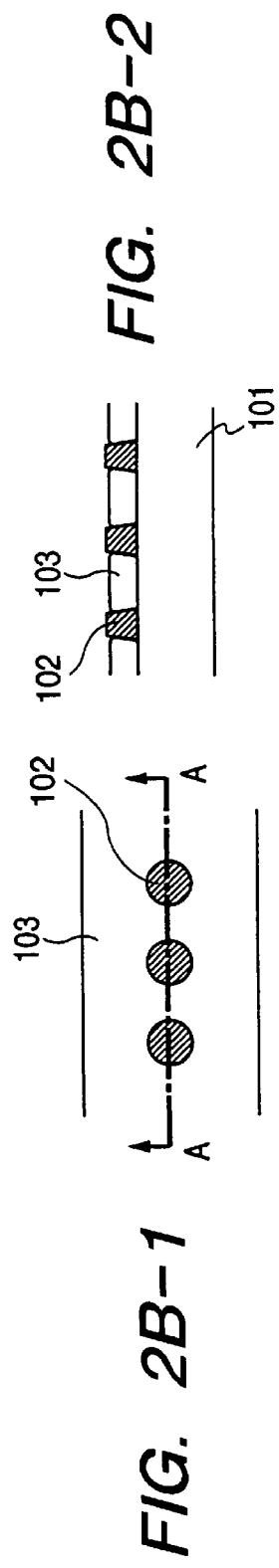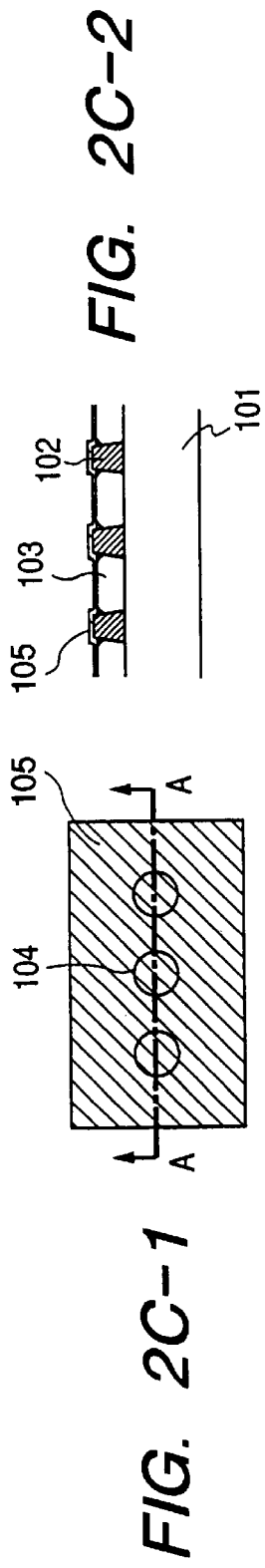

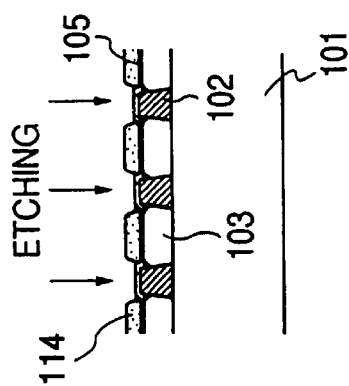
FIG. 2D-1
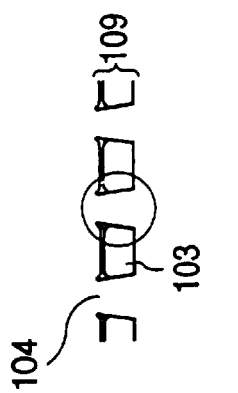
FIG. 2D-2
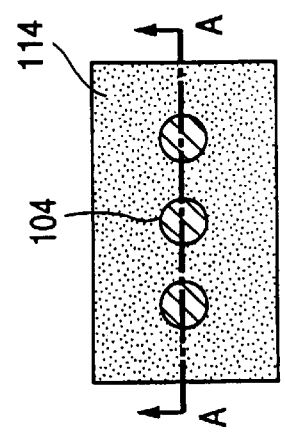
FIG. 2E-1
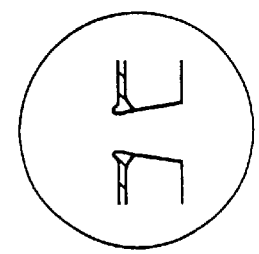
FIG. 2E-2
FIG. 2E-3

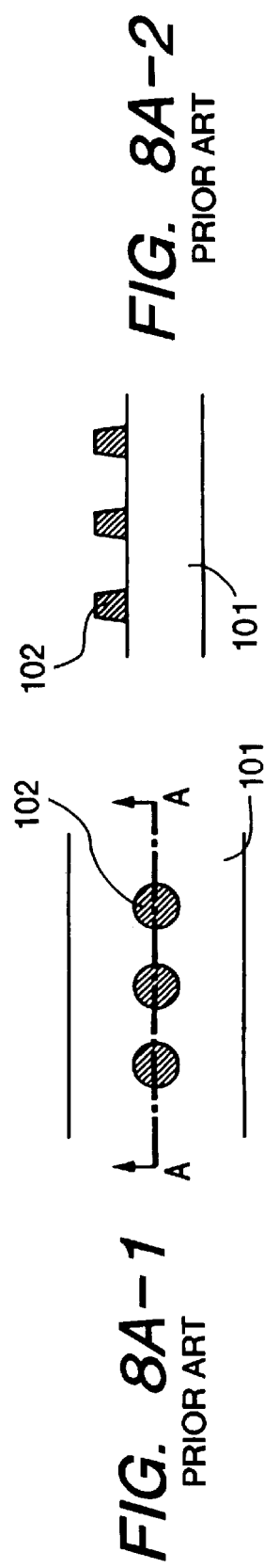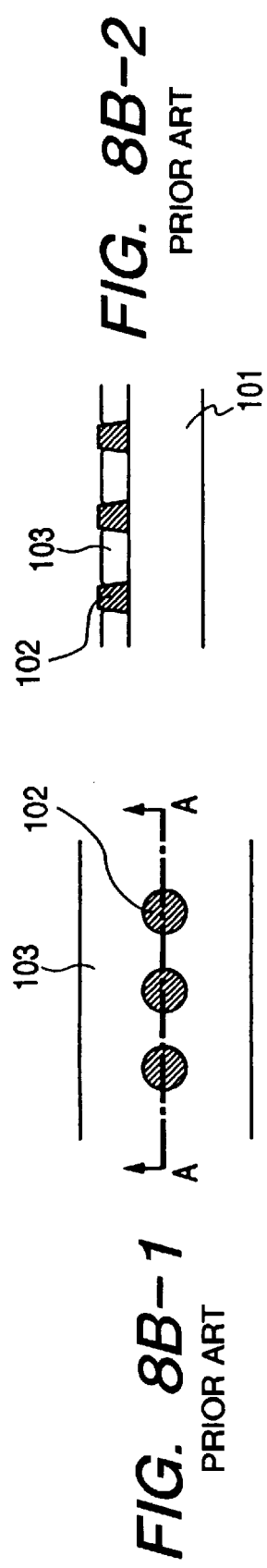

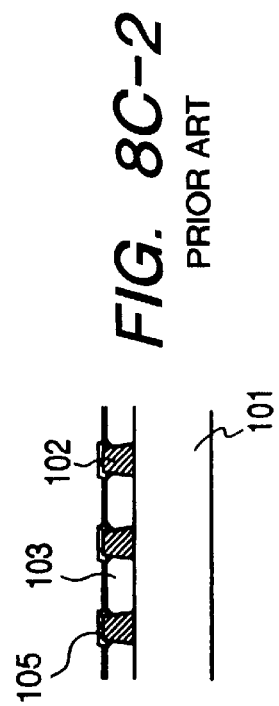
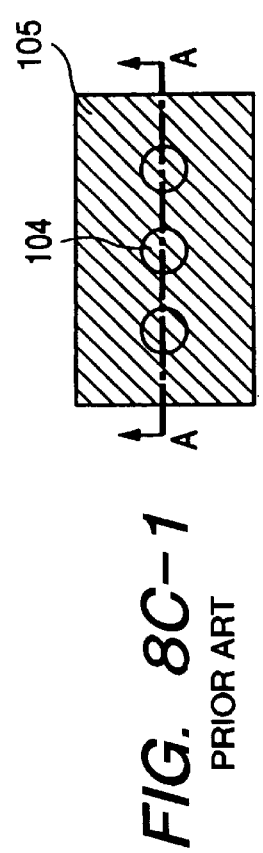
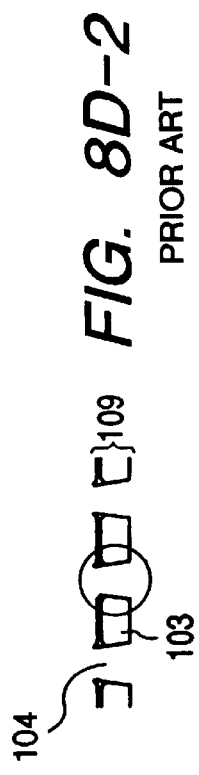
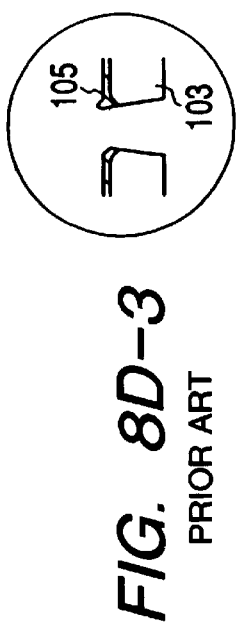
FIG. 8C-1 PRIOR ART
FIG. 8C-2 PRIOR ART
FIG. 8D-1 PRIOR ART
FIG. 8D-2 PRIOR ART
FIG. 8D-3 PRIOR ART

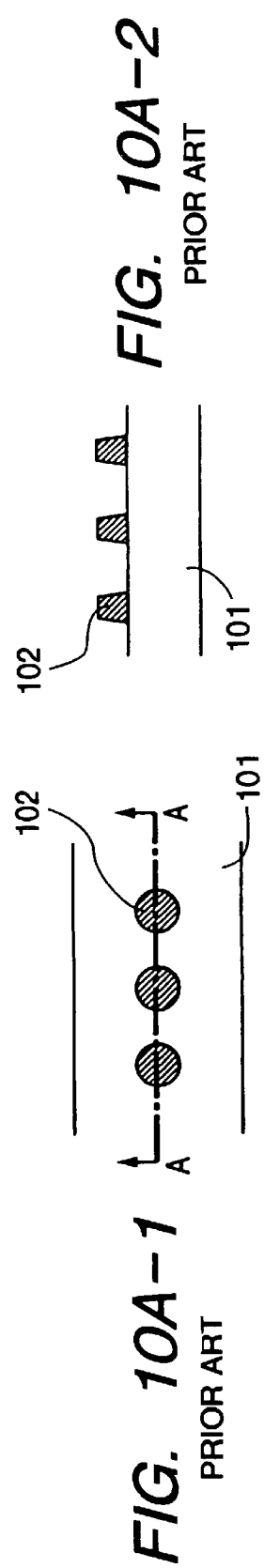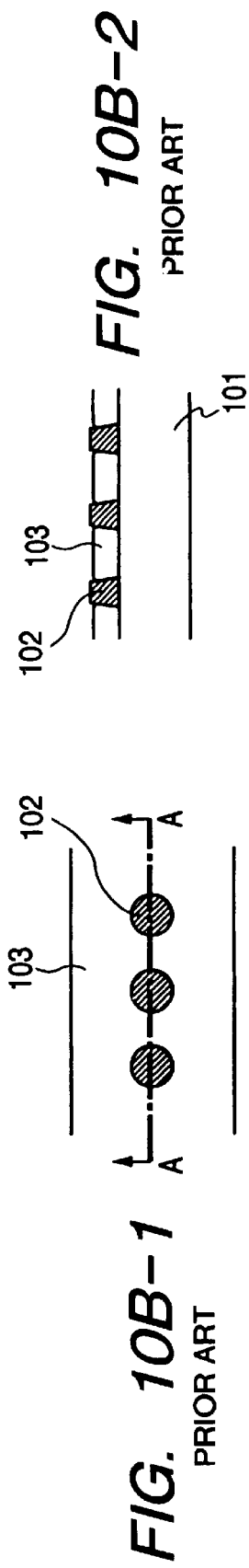
FIG. 10A-1 PRIOR ART
FIG. 10A-2 PRIOR ART
FIG. 10B-1 PRIOR ART
FIG. 10B-2 PRIOR ART

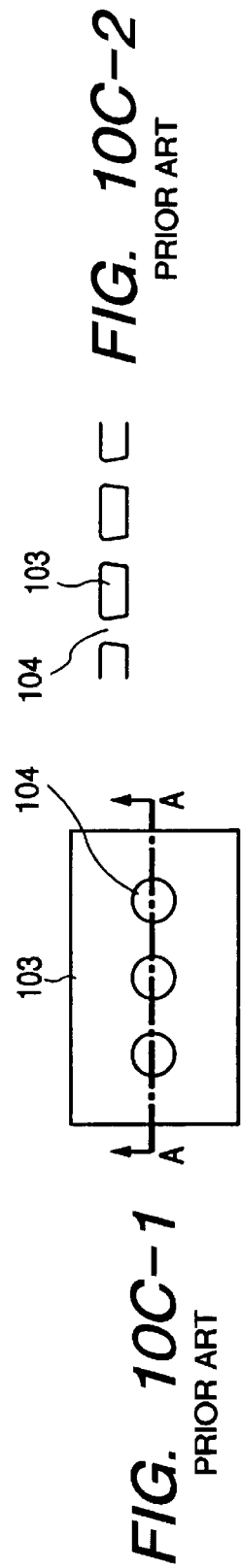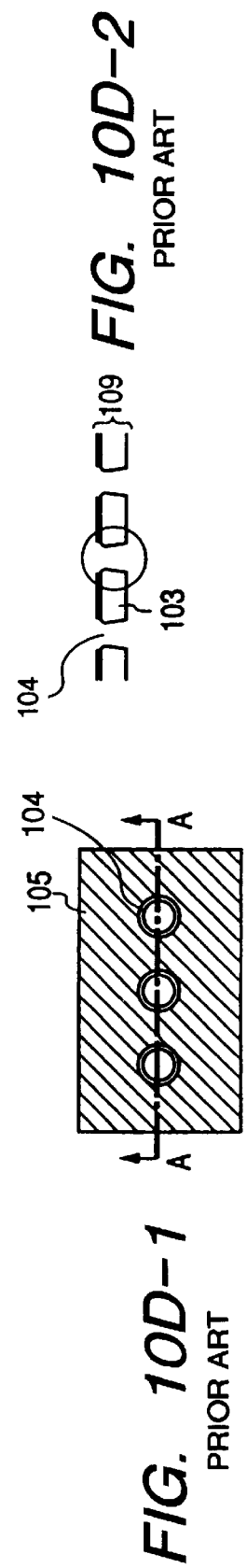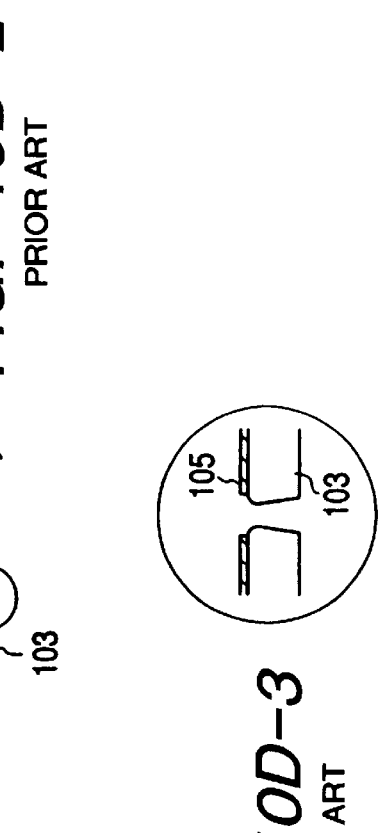

METHOD FOR MANUFACTURING ORIFICE PLATE AND LIQUID DISCHARGE HEAD

BACKGROUND OF THE INVENTION

1. Field of the Invention

The present invention relates to a method for manufacturing an orifice plate having the through holes arranged on a plate material, which become orifices for discharging liquid droplets. Also, the invention relates to a method for manufacturing a liquid discharge head provided with an orifice plate through which desired liquid is discharged by the creation of bubbles by the application of thermal energy or the like.

2. Related Background Art

There has been known conventionally the so-called bubble jet recording method, which is an ink jet recording method whereby to provide ink with thermal energy or the like to change the states of ink with the abrupt voluminal changes (creation of bubbles) of ink to follow, and then, to discharge ink from the discharge ports by the active force based upon this change of states, thus allowing ink to adhere to the surface of a recording medium for the formation of images. As disclosed in the specifications of Japanese Patent Publication Nos. 61-059911 and 61-059914, and others, the recording apparatus that adopts the bubble jet recording method is generally provided with discharge ports through which ink is discharged; the ink flow paths communicated with the discharge ports; and heat generating elements (electrothermal transducing devices) arranged in the ink flow paths as energy generating means for discharging ink.

In accordance with a recording method of the kind, it is possible to record high quality images at higher speeds with a lesser amount of noises. At the same time, the discharge ports of the head that uses this recording method can be arranged in higher density to discharge fine ink droplets, hence making it possible to record images in a high resolution with the apparatus that can be made smaller accordingly. Color images can also be obtained easily, among many other excellent features. As a result, the bubble jet recording method has been widely utilized in recent years for a printer, a copying machine, a facsimile equipment, and other office equipment. Further, it has been used for the textile printing system or other industrial ones.

Along with the wider application of bubble jet technologies and techniques as described above, it has been strongly demanded to develop a recording apparatus of a higher resolution at lower costs.

Now, in conjunction with FIGS. 8A to 8D, the description will be made of the conventionally proposed method for manufacturing a liquid discharge head provided with an orifice plate having orifices formed on it (which is disclosed in the specification of Japanese Patent Laid-Open Application No. 02-188255).

(A) The resist 102 is formed on the conductive substrate 101 (SUS substrate, for example) by the utilization of the photolithographic techniques.

(B) After that, by means of electroforming, the metallic layer 103 (nickel, for example) is formed on the conductive substrate 101.

(C) The water repellent layer 105 are formed on the resist 102, and the metallic layer 103 produced by means of electroforming.

(D) At the same time that the resist 102 is removed from the conductive substrate 101, the water repellent layer on the orifice unit is removed by peeling off the orifice plate 109 from the conductive substrate 101.

(E) The orifice plate is adhesively bonded to the elemental substrate 106 that includes the energy generating elements 107 and the flow paths 113 produced in advance, hence completing a part of the liquid discharge head (FIGS. 8A to 8D).

Now, another conventional techniques will be described in conjunction with FIGS. 10A to 10D.

(A) The resist 102 is formed on the conductive substrate 101 (SUS substrate, for example) by the utilization of the photolithographic techniques.

(B) After that, by means of electroforming, the metallic layer 103 (nickel, for example) is formed on the conductive substrate 101.

(C) At the same time that the resist 102 is removed from the conductive substrate 101, the orifice plate 109 is peeled off from the conductive substrate 101.

(D) After that, the water repellent agent 105 is transferred to complete the orifice plate 109.

(E) The orifice plate is adhesively bonded to the elemental substrate 106 that includes the energy generating elements 107 and the flow paths 113 produced in advance, hence completing a part of the liquid discharge head (FIGS. 10A to 10D).

However, there are following problems encountered in the method for manufacturing the liquid discharge head provided with the orifice plate having the orifices as described above if it is intended to obtain a liquid discharge head of a higher performance.

In accordance with the conventional method shown in FIGS. 8A to 8D, when the orifice plate 109 is peeled off, the resist 102 is removed, and also, the water repellent agent 105 on the orifice unit is removed at the same time. Therefore, as shown in FIG. 8D, the water repellent agent 105 presents an abnormal configuration on the surface of the orifice plate unit on the opening side. As a result, the stabilized sectional area of the orifice opening unit cannot be provided. Thus, the sectional area of the orifice opening unit is not formed invariably to make it impossible to obtain prints in a higher quality. Also, since the orifice unit is in an abnormal configuration, the directional accuracy of the ink droplets 110 cannot be kept invariably as shown in FIG. 9. As a result, the printing operation is affected so as to produce the twisted discharges or uneven prints eventually.

Also, in accordance with the conventional method of manufacture shown in FIGS. 10A to 10D, when the orifice plate is formed on the conductive substrate 101 by means of electroforming, the metallic layer 103 gets into the resist 102. Then, as shown in FIG. 10D, the circumference of each orifice of the orifice plate on the surface side is formed in the R-letter form. Even if it is intended to transfer the water repellent agent 105 to the orifice plate thus formed, the water repellent agent 105 is not transferred to the R-letter formed portions. As a result, as shown in FIG. 11, ink is caused to reside on each of the R-letter portions of the metallic layer, and it may take a long time to refill ink for the one thus residing, which causes the frequency response to be degraded.

SUMMARY OF THE INVENTION

The present invention is designed in consideration of these problems as discussed above. It is an object of the invention to provide a recording apparatus whereby to implement recording in higher resolution at higher frequency, and to record images in higher quality without twisted prints and the unevenness of the recorded images as well.

In order to achieve such objective, the method of the present invention for manufacturing an orifice plate is to manufacture the orifice plate provided with a plate material having a through hole arranged to become an orifice for discharging liquid, and comprises the following steps of:

a. arranging a resin layer in a position corresponding to the through hole on the surface of a conductive substrate in a configuration corresponding to the through hole in a thickness corresponding at least to the length of the through hole;

b. forming a metallic layer by means of electro-forming on the exposed surface of a portion of the conductive substrate corresponding to the plate material in a thickness corresponding to the thickness of the plate material in order to obtain the metallic layer in a state where the resin layer is filled in the through hole portion;

c. applying water repellent resin to the surface of the metallic layer having the resin layer filled therein;

d. peeling off the metallic layer from the conductive substrate together with the resin layer to obtain the plate material in a state where the through hole portion is filled with the resin layer; and e. removing by the laser irradiation the resin layer portion of the plate material in a state where the resin layer is filled in the through hole portion having the water repellent layer coated on the surface in order to form the through hole.

Also, still another method of the present invention for manufacturing an orifice plate is to manufacture the orifice plate provided with a plate material having through holes arranged to become orifices for discharging liquid, and comprises the following steps of:

a. arranging a first resin layer in a position corresponding to the through hole on the surface of a conductive substrate in a configuration corresponding to the through hole in a thickness corresponding at least to the length of the through hole;

b. forming a metallic layer by means of electroforming on the exposed surface of a portion of the conductive substrate corresponding to the plate material in a thickness corresponding to the thickness of the plate material in order to obtain the metallic layer in a state where a first resin layer is filled in the through hole portion;

c. coating water repellent resin on the surface of the metallic layer having the first resin layer filled therein;

d. covering a second resin layer on the surface of the metallic layer having the water repellent resin coated thereon with the exception of the portion corresponding to the through hole opening portion;

e. removing the water repellent resin on the portion corresponding to the through hole opening portion by means of etching through the second resin layer;

f. peeling off the plate material from the conductive substrate together with the first and second resins; and g. processing to open a through hole by removing the first resin and the second resin from the plate material provided with the water repellent resin on the aforesaid surface.

Also, the method of the present invention for manufacturing a liquid discharge head comprises the step of arranging orifices for discharging liquid droplets on the leading end of the liquid paths by installing the orifice plate on the discharge head member provided with the liquid paths, and the discharge energy generating elements to generate energy for discharging liquid in the liquid paths as liquid droplets.

With this method, the orifice plate is formed by either one of the methods of the present invention for manufacturing an orifice plate as referred to in the preceding paragraphs.

In accordance with the method of the present invention, the orifices of the orifice plate are formed by removing the resin layer with the laser irradiation or with the elution using the remover. As a result, the variation of the sectional areas of the orifice opening portion is made smaller to prevent the orifices from being in an abnormal configuration. Hence, it becomes possible for the liquid discharge head using the orifice plate thus obtained by means of the method of the present invention to obtain the recorded images in higher quality. Also, with the water repellent layer formed on the orifice opening portion entirely, the refilling of ink is made faster to make it possible to print at higher frequency.

BRIEF DESCRIPTION OF THE DRAWINGS

FIGS. 1A, 1B, 1C, 1D and 1E are plan views and cross-sectional views which schematically illustrate a first invention (a first embodiment).

FIGS. 2A, 2B, 2C, 2D and 2E are plan views and cross-sectional views which schematically illustrate a second invention (a second embodiment).

FIGS. 8A, 8B, 8C and 8D are cross-sectional views and plan views which schematically illustrate the conventional method for manufacturing an orifice plate.

FIGS. 10A, 10B, 10C and 10D are cross-sectional views and plan views which schematically illustrate another conventional method for manufacturing an orifice plate.

DETAILED DESCRIPTION OF THE PREFERRED EMBODIMENTS

Figure 3:
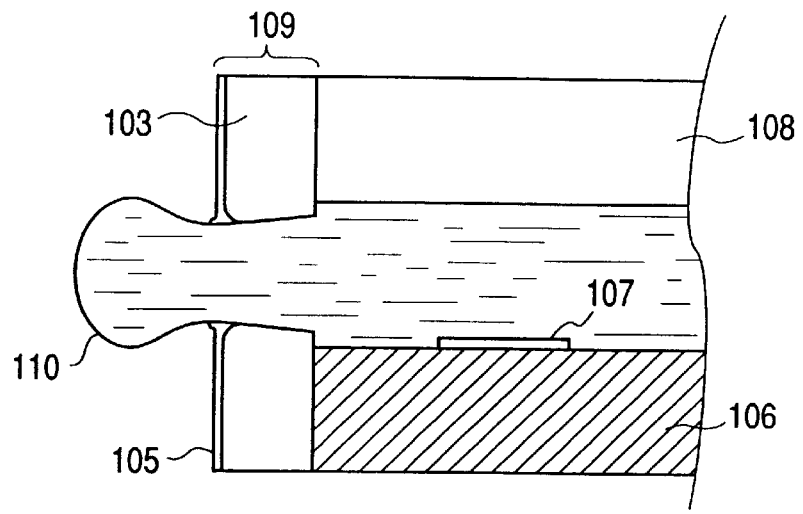
FIG. 3 is a cross-sectional view which shows a liquid jet discharge head schematically in accordance with a third invention (both the first and second embodiment).

Hereinafter, with reference to the accompanying drawings, the embodiments will be described in accordance with the present invention.

The method for manufacturing an orifice plate embodying the present invention utilizes the photosensitive resin to form the resin layer 102 on the conductive substrate 101 as shown in FIG. 1A. After that, the metallic layer 103 is formed by means of electroforming as shown in FIG. 1B. Nickel is used for the metallic layer thus formed. It may be possible to use the nickel alloy having cobalt or palladium mixed. Then, as shown in FIG. 10C, after the metallic layer 103 has been formed, the water repellent layer 105 is coated on the metallic layer 103 and the resin layer 102 by the application of spinner, splay, rolling coater, or the like. In this manner, the step between the metallic layer 103 and the resin layer 102 can be buried by means of the water repellent layer 105. At the same time, the surface can be made smooth. Also, in this case, it may be possible to form the contact enhancement layer between the metallic layer 103 and the water repellent layer 105. For the method for forming the contact enhancement layer, it may be possible to apply a sealant, A1110 (product name: manufactured by Nippon Unika K.K.).

Then, as shown in FIG. 1D, the metallic layer 103 is peeled off from the conductive substrate 101. The metallic layer is the plate member having the through hole portion which provides orifices, but in a state of being filled with the resin layer 102. After that, excimer layer is irradiated over the entire face of the plate member from the reverse side of the face of the plate member where the water repellent layer 105 has been formed. At this juncture the metallic layer 103 is not removed by the irradiation of the excimer laser, but only the resin layer 102 is completely removed. Thus, orifices 104 are formed. In this manner, the orifice plate 109, which is provided with the tapered orifices 104, is completed as shown in FIG. 1E.

For the conductive substrate prepared by the method as described above, it is possible to form the metallic layer by means of electroforming, and use preferably the plate substrate formed with the material, such as stainless steel, iron, nickel, copper, brass, or aluminum if only the material used can be peeled off after the formation of the metallic layer. Of these materials, the stainless steel is more preferable because it has corrosion resistance. Of the stainless steel, SUS-304 and SUS-316 are particularly preferable. As the peeling method applicable to the conductive substrate, there is, among some others, the one whereby to apply the ultrasonic waves while the substrate is immersed in the remover or the one whereby to apply the inverted bias of the one applied at the time of electroforming, while the substrate is immersed in the liquid which is used for electroforming the metallic layer. Here, the step in which the conductive substrate is peeled off is carried out after the step in which the water repellent layer is formed so that the formation of the water repellent layer is facilitated. However, if the metallic layer is sufficiently thick, it may be possible to form the water repellent layer in the same liquid after having peeled off the substrate by the application of the inverted bias following the execution of the electroforming.

Also, as the photosensitive resin, it is preferable to use the one which does not present any changes in the configuration after the formation of the metallic layer by means of the electroforming, but it is still possible to secure the desired orifice configuration, and also, to enable the drilling work to be performed effectively by the laser processing. For example, the dry film or resist for plating use, such as manufactured by Tokyo Oka K.K., may be utilized. With the fine process requirement, and the corrosion-resistance in view, it is preferable to use the dry film, SY-325 or the resist, PMER (both product names: manufactured by Tokyo Oka K.K.). Of these products, the PMER is particularly preferable. In this respect, it is possible to use either the positive type or the negative type photosensitive resin. However, it is desirable to use the positive type photosensitive resin for the enhancement of the removal performance upon removing the resin layer 102 entirely.

The layer thickness of the resin layer should be that of the metallic layer corresponding at least to the thickness of the orifice plate. If, for example, the thickness of the orifice plate is 20 $\mu$m, the resin layer should be thicker than the thickness of the orifice plate. Then, it is preferable to make the thickness of the resin layer is approximately 25 $\mu$m.

As to the water repellent agent, any one of agents is usable if only it can achieve the purpose of its use. For example, fluororesin is usable. In this respect, it is particularly preferable to use Cytop (product name: manufactured by Asahi Glass K.K.) from the viewpoint of its water-repellency. The amount of its adhesion or the layer thickness may be determined so as to obtain the intended effect. Also, the water repellent agent is coated on the metallic layer, hence making it possible to smooth the surface thereof.

Although depending on the material of resin layer and the layer thickness, the condition of laser beam irradiation is, in general, the oscillation energy=0.5 to 2 J/cm$^2$·pulse, frequency=10 to 300 Hz, the pulse number=100 to 500 pulses. Further, in consideration of the hole configuration and thermal influence, it is preferable to set the oscillation energy at 0.8 to 1.2 J/cm$^2$·pulse, and in consideration of the performance on the large-scale production, it is preferable to set the frequency at 150 to 250 Hz. If the orifice plate thickness is 20 $\mu$m, it is preferable to set the pulse number at 150 to 200 pulses for the reasons that holes should be open completely. Here, the excimer laser can be utilized as the laser, for example.

As shown in FIGS. 2A to 2C, another method for manufacturing the orifice plate in accordance with the present invention is the same as the method of the first invention in the steps in which the conductive substrate 101 is prepared, and the resin layer 102 is formed, and the metallic layer 103 is formed by means of electroforming, and then, the water repellent layer 105 is coated. After that, as shown in FIG. 2D, a second resin layer 114 is formed on the water repellent layer, and by the utilization thereof, the water repellent layer is etched on the orifices.

Subsequently, when the orifice plate 109 is peeled off from the conductive substrate 101, the resin layer releasing liquid is used. Then, as shown in FIG. 2E, the orifices 104 are formed by peeling off the first resin layer and the second resin layer at the same time. Hence, the orifice plate 109 is completed.

As the second resin layer, any one of layers is usable if only it has the properties for use of removal from the water repellent agent on the upper portion of the orifices so as to be capable of performing the removal of the resin layer effectively from the water repellent layer arranged on the surface of the metallic layer. For example, there may be used the positive type resist OFPR-800 (product name: manufactured by Tokyo Oka, K.K.) or the like.

To remove the water repellent layer on the orifice portion, it is preferable to use the activated gas for etching use produced by the combination of carbon tetrafluoride and oxygen, irrespective of the dry etching, wet etching, or the like which is equally applicable.

Now, in conjunction with FIG. 4, the description will be made of the step in which the orifice plate 109 is adhesively bonded to the elemental substrate having the discharge ports formed on it in accordance with the method for manufacturing a liquid discharge head in accordance with the present invention. Here, the orifice plate is completed by means of any one of the methods for manufacturing an orifice plate in accordance with the present invention.

The bonding agent is applied to the orifice plate side, and the member (orifice plate 109) having the orifices formed is bonded to the face portion of the liquid discharge head having the flow paths 112, the elemental substrate 106, and the ceiling plate 108. At this juncture, it may be possible to coat the bonding agent on the face side or transfer it to that side. Also, the epoxy bonding agent is typically used as the bonding agent, but it may be possible to use the one having the thermal plastic property or silicone or hot-melt type.

Figure 4:
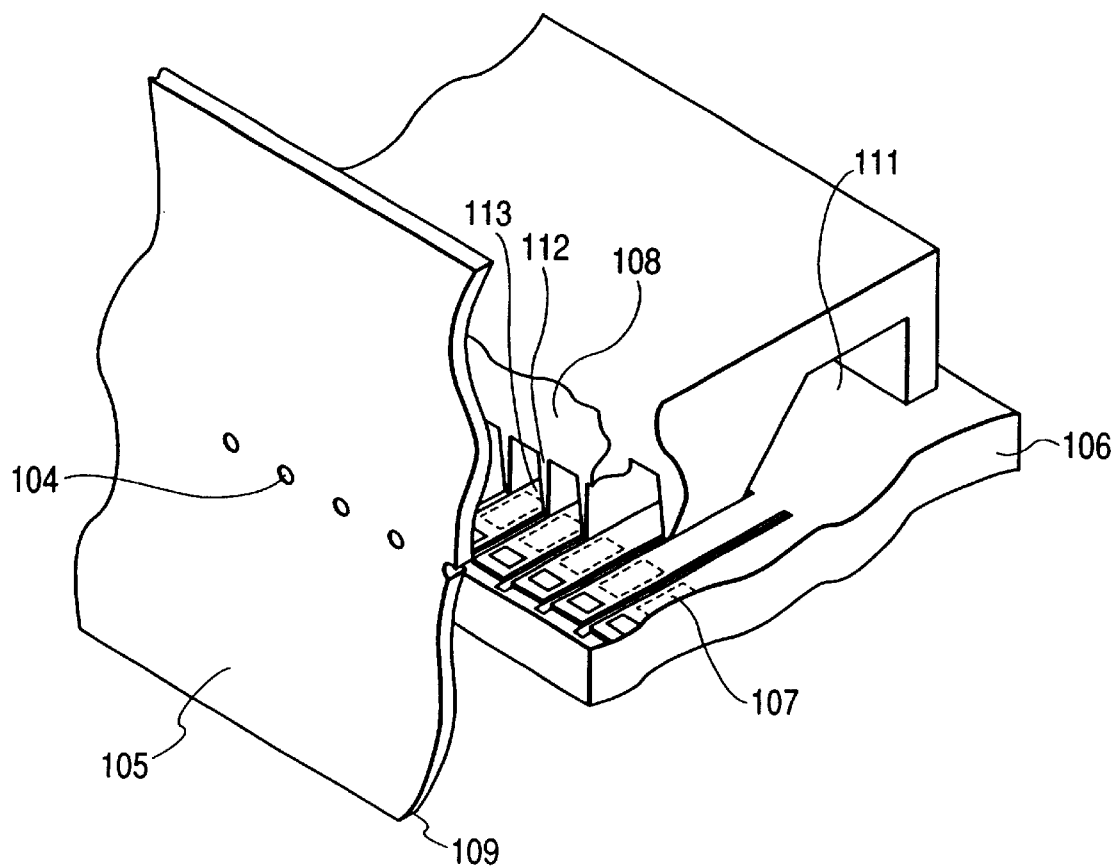
FIG. 4 is a perspective view which schematically illustrates the liquid discharge head in accordance with the third invention.

After the orifice plate is adhesively bonded, it is assembled in the ink cartridge 17 to complete the liquid discharge head as shown in FIG. 4.

Figure 5:
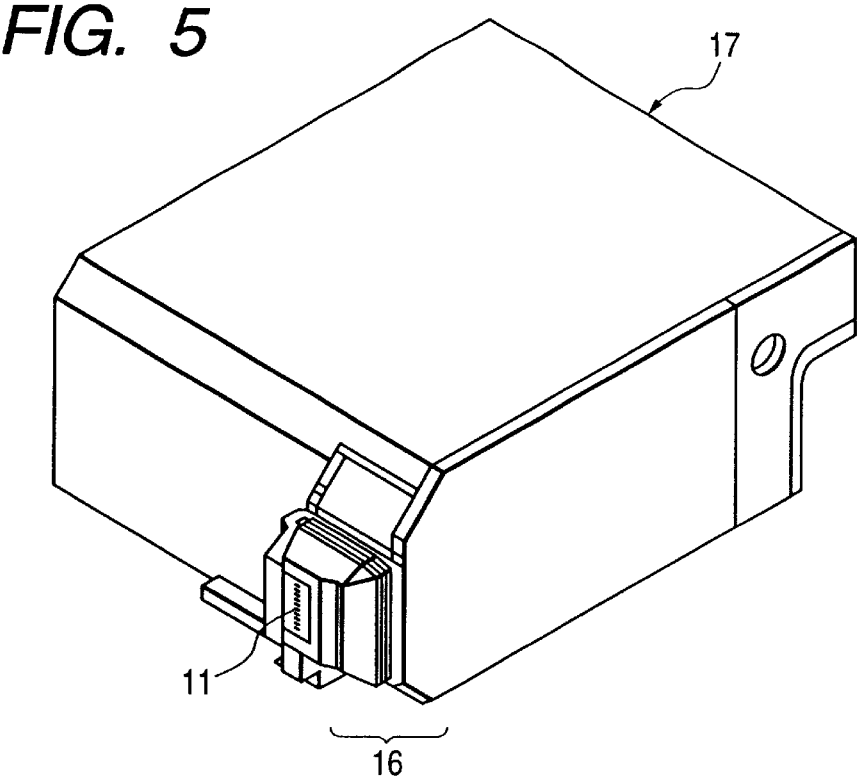
FIG. 5 is a view which illustrates the head cartridge in accordance with the third invention.

FIG. 5 is a view which shows the head cartridge 17 having the ink container for holding liquid to be supplied to the liquid discharge head of the present invention. Here, it is possible to refill ink in the ink container after ink has been consumed.

Figure 6:
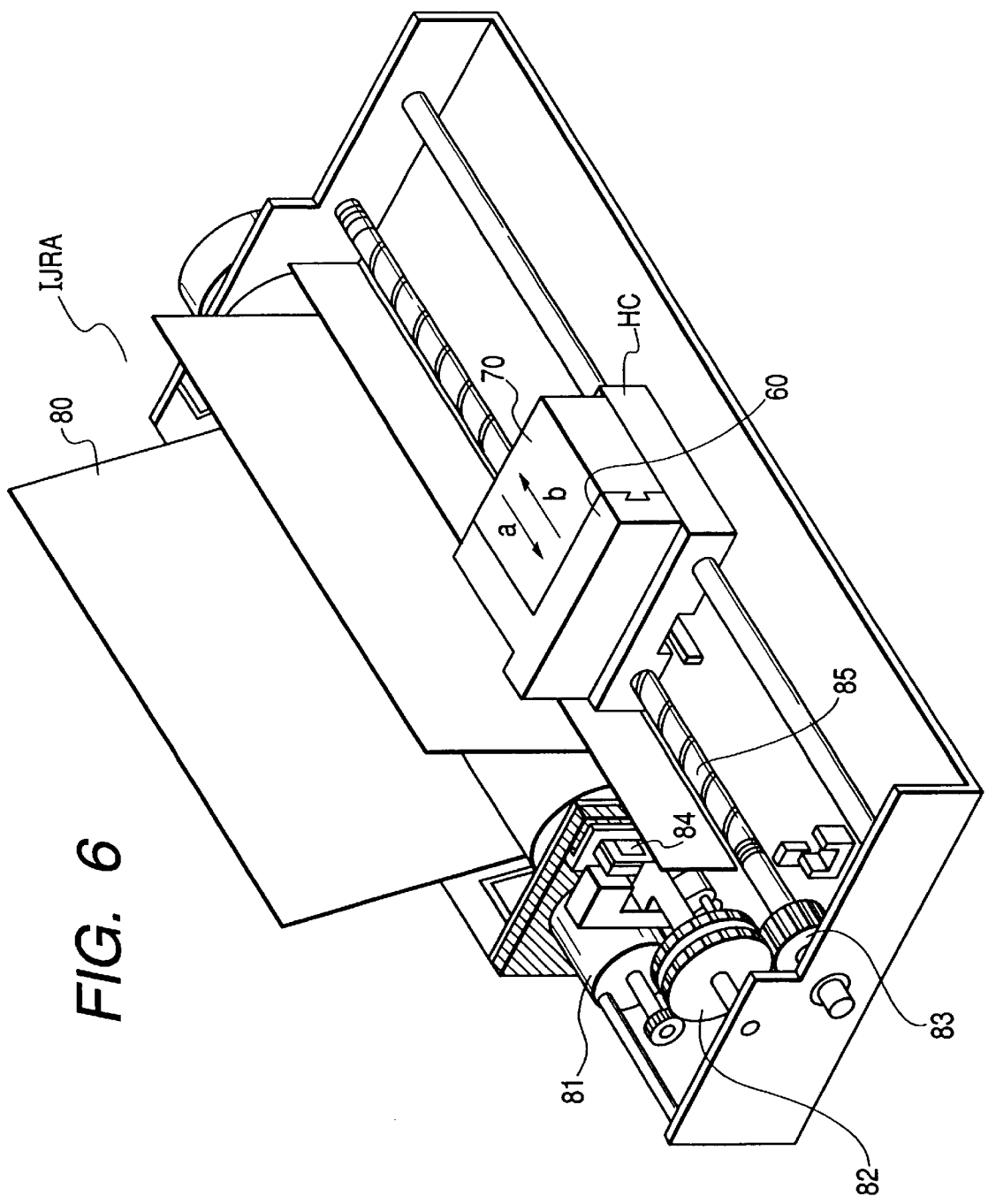
FIG. 6 is a view which shows one example of the liquid jet apparatus in accordance with the third invention.
Figure 9:
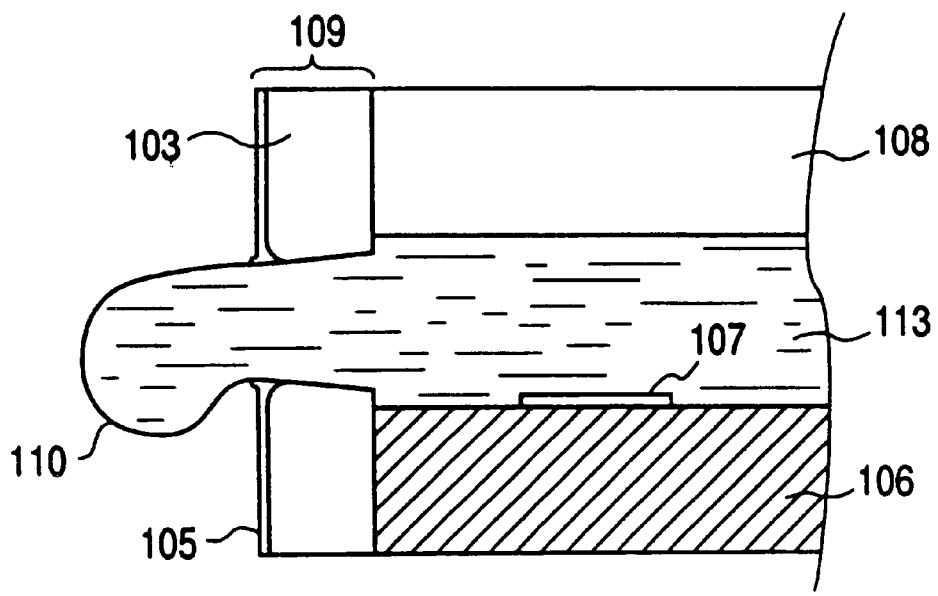
FIG. 9 is a cross-sectional view which illustrates the conventional liquid discharge head schematically.
Figure 11:
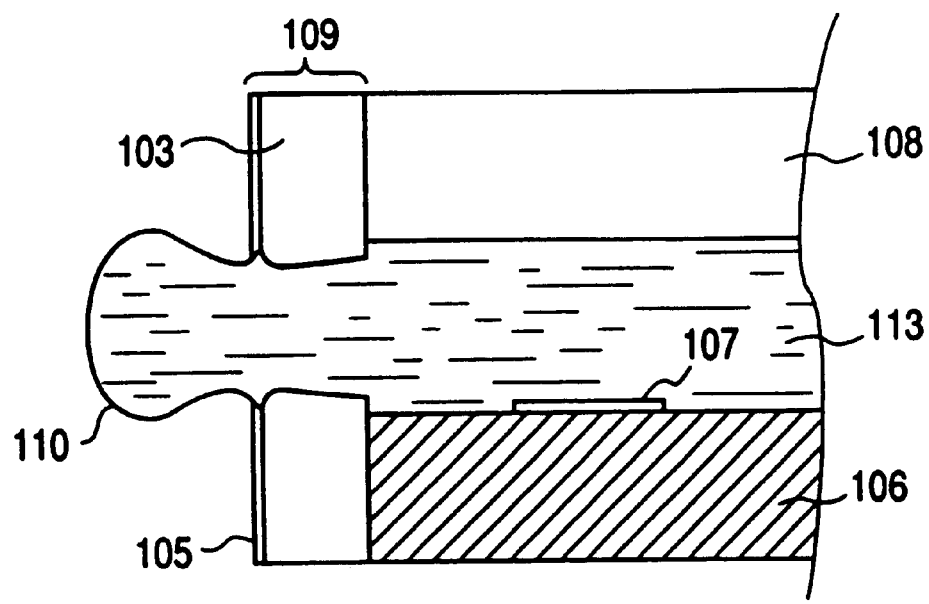
FIG. 11 is a cross-sectional view which illustrates another conventional liquid discharge head schematically.

FIG. 6 is a view which schematically shows the structure of the liquid jet apparatus having the aforesaid liquid discharge head mounted thereon. On the carriage HC of the liquid jet apparatus of the present embodiment, there is mounted the head cartridge having the liquid tank unit 70 and the liquid discharge head unit 60 detachably installed on it. The carriage can reciprocate as indicated by arrows a and b in the width direction of a recording medium 80 carried by recording medium carrying means.

Also, the liquid jet apparatus of the present embodiment is provided with the motor 81 serving as the driving source to drive the recording medium carrying means and the carriage HC, and also, with the gears 82 and 83 to transmit the driving power of the driving source to the carriage HC, and the carriage shaft 85, among some others. With this recording apparatus and the liquid discharge method adopted for this recording apparatus, it becomes possible to obtain the objective images in good condition by discharging liquid to various kinds of recording media.

Figure 7:
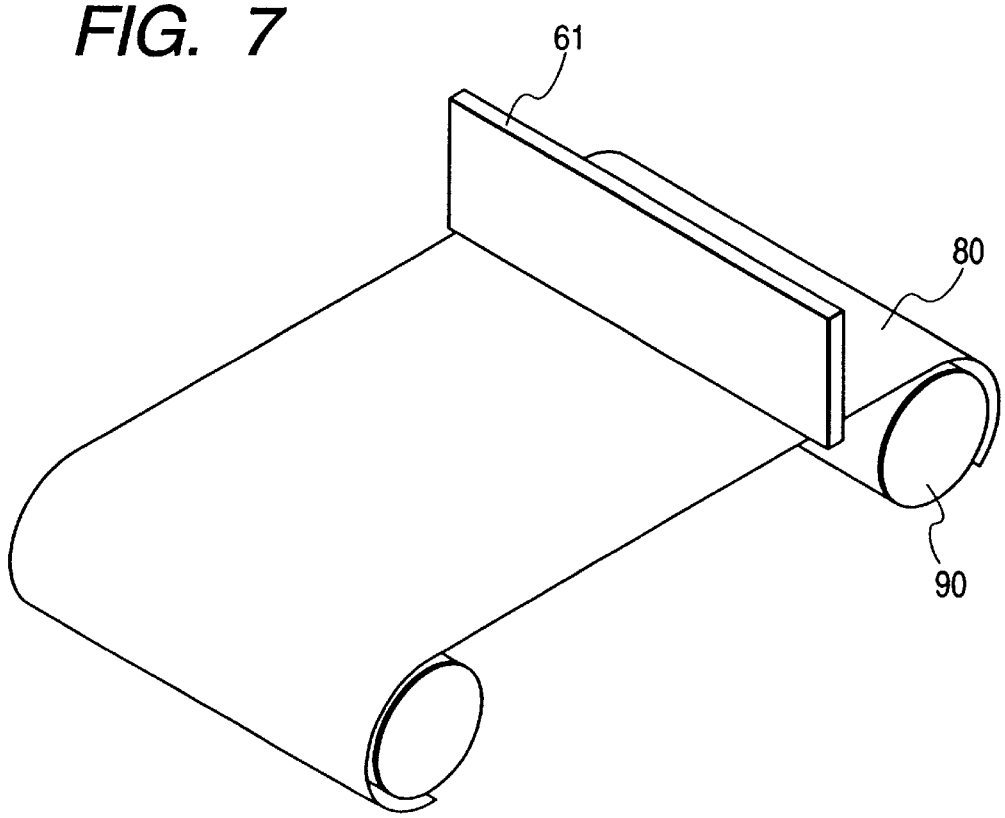
FIG. 7 is a view which illustrates the full line head in accordance with the third invention.

FIG. 7 is a view which schematically shows the socalled full line head having a plurality of discharge ports arranged over the recordable area of a recording medium 80, and the apparatus as well, in accordance with the present invention. In FIG. 7, a reference numeral 61 designates the full line head which is arranged in the position shiftable to the recording medium 80. A reference numeral 90 designates the carrier drum which serves as recording medium carrying means.

So far, the present embodiment has been described. Here, however, it is needless to mention that each of the liquid discharge heads and liquid jet apparatuses of the present invention corresponds to each of the ink discharge methods, ink discharge recording heads, ink jet recording apparatuses that uses the recording ink as the liquid which is discharged.

(First Embodiment)

For the present embodiment, the method which is illustrated in conjunction with FIGS. 1A to 1E is the example in which the orifice plate is formed.

At first, the resin layer 102 is formed on the conductive substrate 101 (SUS substrate) by the utilization of the photosensitive resin. In this respect, the positive type resist (product name: PMER) manufactured by Tokyo Oka K.K. is used for the photosensitive layer formed in a thickness of 16 $\mu$m. After that, the metallic layer 103 is formed by means of electroforming in a thickness of 17 $\mu$m. After the metallic layer 103 is formed, the water repellent resin is coated by means of the splay method on the metallic layer 103 and the resist layer 102 to form the water repellent layer 105. The water repellent resin used then is the Cytop (product name: manufactured by The Asahi Glass K.K.) and coated under the condition given below using the splay coating machine manufactured by the Nordson Inc. (a microspraying apparatus):

Pressure: 1.5 kg/cm$^2$
Feeding rate: 15 mm/sec.
Feed amount: 10 mm

With the coating of the water repellent agent under this condition, the water repellent layer 105 is formed in a thickness of 0.1 to 0.3 $\mu$m.

After that, the conductive substrate 101 and the metallic layer 103 are again immersed in the liquid used for the application of the electroforming. Then, the inverted bias of the one applied at the time of electroforming is applied in the liquid to peel off the orifice plate 109 from the conductive substrate 101 (SUS substrate). Subsequently, the entire face of the orifice plate is irradiated by excimer laser to remove the resin layer 102. Thus, the orifices 104 are formed. Here, the condition of the laser processing then is:

Oscillation energy=1 J/cm$^2$·pulse
Frequency=200 Hz
Pulse number=200 pulses

Then, after the orifices are laser processed, the orifice plate is completed as shown in FIG. 1E.

Now, in conjunction with FIG. 4, the description will be made of the bonding process in which the orifice plate 109 is adhesively bonded to the elemental substrate having the flow paths formed on it.

By use of the transfer method, the epoxy bonding agent is coated on the orifice plate side. Then, the member (orifice plate 109) having orifices are formed is bonded to the face of the liquid discharge head provided with the flow paths 112, the elemental substrate 106, and the ceiling plate 108, and then, assembled into the ink cartridge 17 to complete the liquid discharge head is completed as shown in FIG. 4.

FIG. 3 shows the discharging state of the head thus completed. The orifice unit is stably formed in a specific configuration. The water repellent layer is formed around orifices uniformly. As a result, there is no print twisting, and high quality images are obtainable. Also, ink is not allowed to spread over the face of the orifice unit to speed up the ink refilling, hence making it possible to print with a quicker responses.

(Second Embodiment)

The present embodiment relates to the example in which an orifice plate is formed in accordance with a method shown in FIGS. 2A to 2D.

At first, the conductive substrate 101 is prepared. The resin layer 102 is formed, and the metallic layer 103 is also formed by means of electroforming. Then, the water repellent layer 105 is formed as in the first embodiment.

After that, a second resin layer 114 is formed on the water repellent layer with the patterning which utilizes the photolithographic process. Then, with the second resin layer which is used as the mask, the water repellent layer is etched to remove the water repellent layer on the orifices. The second resin used at that time is the positive type resist OFPR-800 (product name: manufactured by Tokyo Oka K.K.). The thickness of the second resin layer is 2 $\mu$m. Also, at this juncture, the etching is performed by the dry etching method in a condition of power=500 W under a pressure of 10 pascal in a gas flow rate (carbon tetrafluoride=50 SCCM and oxygen=10 SCCM).

Then, a specific resin layer releasing agent is used when the orifice plate 109 is peeled off from the conductive substrate 101 (SUS substrate). The first resin layer and the second resin layer are peeled off at the same time to form the orifices 104. Thus, the orifice plate 109 is completed.

Subsequently, the orifice plate 109 thus completed is adhesively bonded to the elemental substrate having the discharge ports formed on it, and then, assembled into the ink cartridge 17. The steps in which to complete the liquid discharge head as shown in FIG. 4 are the same as those in the first embodiment.

The discharge condition of the head thus completed is substantially the same as the first embodiment (as shown in FIG. 3), and other configurations and performances are also substantially the same as those of the first embodiment.

The orifice plate of the present invention, which is obtainable by either one of the methods of manufacture described above, has the orifice unit formed stably in a specific configuration, and the water repellent agent is applied to the circumference of the orifices uniformly. Likewise, the method of the present invention for manufacturing a liquid discharge head using either one of these orifice plates provides the liquid discharge head which is capable of printing without any print twisting caused by the unstable configuration of the orifice unit, hence making it possible to obtain images in higher quality. Also, the water repellent agent (area) is formed uniformly around the orifices to prevent the ink face from spreading widely. As a result, the ink refilling becomes quicker to make printing possible with quicker responses accordingly.

What is claimed is:

1. A method for manufacturing an orifice plate with a plate material having a through hole arranged to become an orifice for discharging a liquid droplet, the plate material having a water-repellent resin on a surface thereof, comprising the steps of:

a. arranging, on a resin pattern formation surface of a conductive substrate, a pillar-like resin pattern having a shape corresponding to the through hole and a thickness corresponding at least to a length of the through hole;

b. forming, on the resin pattern formation surface of the conductive substrate, a metallic layer having a thickness corresponding to a thickness of the plate material, by means of electroforming, so as to surround the resin pattern;

c. forming a water repellent resin layer on a surface of the resin pattern and the metallic layer;

d. peeling off the metallic layer having the water repellent resin layer and the resin pattern from the conductive substrate; and e. irradiating the metallic layer having the water repellent resin layer and the resin pattern by a laser from a side opposite a surface on which the water repellent resin layer is formed, so as to remove the resin pattern and a portion of the water repellent resin layer in contact with the resin pattern in order to form the through hole.

2. A method for manufacturing an orifice plate according to claim 1, wherein the resin pattern comprises a positive type photosensitive resin.

3. A method for manufacturing an orifice plate according to claim 1, wherein said water repellent resin layer forming step is executed before the peeling off step.

4. A method for manufacturing an orifice plate according to claim 1, wherein said water repellent resin layer forming step is executed after the peeling off step.

5. A method for manufacturing an orifice plate according to claim 1, wherein the metallic layer is nickel or an alloy containing nickel.

6. A method for manufacturing an orifice plate according to claim 5, wherein the alloy containing nickel contains cobalt and/or palladium besides nickel.

7. A method for manufacturing an orifice plate according to claim 1, wherein the through hole opening portion of the orifice plate is formed by the water repellent resin layer.

* * * * *